United States Patent [19]

Gijzen et al.

[11] Patent Number: 4,694,442
[45] Date of Patent: Sep. 15, 1987

[54] DISC READER WITH OBLIQUITY CORRECTION

[75] Inventors: Wilhelmus A. H. Gijzen; Gerard E. van Rosmalen, both of Eindhoven, Netherlands

[73] Assignee: U.S. Philips Corporation, New York, N.Y.

[21] Appl. No.: 749,149

[22] Filed: Jun. 26, 1985

[30] Foreign Application Priority Data

Mar. 4, 1985 [NL] Netherlands ............... 8500592

[51] Int. Cl.⁴ .................................. G11B 7/00
[52] U.S. Cl. ............................. 369/44; 369/45
[58] Field of Search ........................ 369/44–46, 369/57; 250/201–204; 358/342

[56] References Cited

U.S. PATENT DOCUMENTS

| | | | |
|---|---|---|---|
| 4,135,206 | 1/1979 | Kleuters et al. | 369/44 X |
| 4,502,134 | 2/1985 | Kondo et al. | 369/46 |
| 4,607,357 | 8/1986 | Okano | 369/44 |
| 4,608,680 | 8/1986 | Yano | 369/44 |
| 4,634,853 | 1/1987 | Kanamaru | 369/44 X |

*Primary Examiner*—Robert L. Richardson
*Attorney, Agent, or Firm*—F. Brice Faller

[57] ABSTRACT

An electro-optical device for recording and/or reading recording tracks in a recording surface of an optically readable disk by means of a radiation beam, includes a frame (43), a turntable supporting means (45) for a turntable (55) which is rotatable about an axis of rotation (57), an objective supporting means for an objective (15) having an optical axis (24), a focussing actuator (24) for moving the objective along the optical axis, and guide means for moving the objective and/or the turntable relative to each other between a first position, in which the optical axis and the axis of rotation are situated nearer each other, and a second position, in which these axes are situated more remote from each other. In the case of an oblique position of said surface of the disk, correction means reduce the angle between the optical axis and the normal to the disc surface at the location where the optical axis intersects the disk surface. The correction means includes a tilting device (63) for tilting the turntable supporting means and/or objective supporting means during recording and/or reading of the recording tracks about a pivotal axis (99) which extends at least substantially transversely of the plane defined by the optical axis and the axis of rotation and which, at least in the second position of the objective and the turntable, is situated between the axis of rotation and the optical axis.

17 Claims, 5 Drawing Figures

DISC READER WITH OBLIQUITY CORRECTION

The invention relates to an electro-optical device for recording and/or reading recording tracks in a recording surface of an optically readable disk by means of a radiation beam. The electro-optical device includes a frame, turntable supporting means, and objective supporting means for an objective having a lens system for concentrating the radiation beam to form a radiation spat. A focussing actuator moves the objective along the optical axis, while mechanical guide means guide the objective and the turntable relative to each other in a radial direction between a first position, in which the optical axis and the axis of rotation are situated nearer each other, and a second position, in which these axes are situated more remote from each other. Correction means reduce the angle between the optical axis of the objective and the normal to the disk surface at the location of the intersection of the optical axis and the disk surface.

Such an electro-optical device is described in Netherlands Patent Application No. 8105072, to which copending U.S. application Ser. No. 347,606, filed May 27, 1982 corresponds, (herewith incorporated by reference) and may be employed, in optical video-disk players, optical audio-disk players and optical storage-disk apparatus. The radiation beam is produced by a laser and is concentrated by means of the objective to form a light spot of very small dimensions. The minimum size of the light spot is dictated by the wavelength of the light source and the numerical aperture of the lens system of the objective. The light in the light spot comprises a brighter central portion surrounded by concentric rings of substantially lower intensity. When the center of the light spot is situated on a recording track some of the light is also incident on the adjacent tracks. Consequently, the reflected light not only contains the information from the desired recording track but also information from adjacent recording tracks. The reflected light is received and detected by light-sensitive electronic means of the disk-record player for deriving an electric signal corresponding to the information in the reflected light. The resulting crosstalk between adjacent recording tracks depends largely on the light distribution in the light spot on the recording surface. The light distribution in the light spot is influenced not only by the optical quality of the optical system which forms the light spot and the quality of the light source itself, but also by an oblique orientation of the disk surface. This obliquity mainly gives rise to coma and an increased intensity at one side of the central portion, namely in the direction in which the disk surface is oriented obliquely. Thus, if the surface of the disk is oriented obliquely in a radial direction, increased crosstalk between the recording track scanned by the light spot and an adjacent recording track results. Tests have shown that if an HeNe laser is employed in an optical video recorder intended for normal home-entertainment use the obliquity of the disk should not exceed 1°. However, if an AlGaAs ,laser is employed, which is substantially smaller and cheaper, the obliquity should be less than 0.5°. The reduction in permissible obliquity of the disk in the case of an AlGaAs laser is closely related to the fact that for the same optical bandwidth the numerical aperture of the objective is larger than in the case of a HeNe laser. Moreover, it has been found that coma as a result of the obliquity of the disk surface is proportional to the third power of the numerical aperture. Therefore, the use of AlGaAs lasers may give rise to a substantial increase in crosstalk between adjacent recording tracks in the case of obliquity of the disk.

The obliquity of an optically readable disk depends on several factors, such as tolerances in the manufacture of the disk player and the disk. The obliquity of the disk in a radial direction has a substantial influence on the crosstalk between the recording tracks and this obliquity is caused mainly by deviations in flatness of the surface of the disk as a result of its own weight. Further, material stresses in the optically readable multilayer disk may give rise to a parabolic shape, which also leads to a radial obliquity.

The known electro-optical device comprises automatic correction means for continually and automatically correcting the neutral position of the optical axis during recording and/or reading of the recording tracks. This is accomplished by tilting the objective about a pivotal axis perpendicular to the optical axis through a correction angle which is related to the direction of the normal to the surface of the optical disk at the location of the intersection of the surface of the optical disk with the optical axis of the objective, in order to minimize the angle between the optical axis and the normal in the case of an obliquity of the surface. In this electro-optical device the obliquity of the optical disk is not changed, but its effect on the crosstalk between adjacent recording tracks is reduced by correcting the position of the objective relative to the surface of the optical disk.

In the known electro-optical device the objective supporting means comprises a stationary supporting member which is secured to the frame and a second supporting member which is mounted on the objective and which is movable relative to the first supporting member. An electrical focussing actuator moves the objective along the optical axis from a neutral position of the objective relative to the stationary supporting member, in order to focus the radiation spot onto the recording surface. The use of a focussing actuator is customary in optical disk-record players in view of the very small depth of focus of the objectives used. The depth of focus is of the order of a few micrometers, so that the inevitable small variations in the position of the recording surface can be followed by means of an automatic focussing system.

During the recording and/or reading of the recording tracks on the optical disk the focussing actuator moves the objective to and fro along its optical axis, whilst the objective supporting means of the known electro-optical device ensures that during the focussing movements of the objective the objective is tilted depending on its position. In the known device the objective should be capable of performing a large displacement along its optical axis from a neutral position relative to the stationary bearing member, in order to permit the radially inclined surface of the disk to be followed. Moreover, the objective should be capable of rapidly and frequently performing small displacements along its optical axis to enable local irregularities in the position of the recording surface to be followed. Constructing an actuator which is capable of providing both said large displacement and said small displacements of the objective in an adequate manner is a difficult technical problem.

SUMMARY OF THE INVENTION

The invention aims at providing an electro-optical device, in which for the correction of the obliquity of the optically readable disk during recording and/or reading of the recording tracks it is not necessary to use the focussing actuator for adapting the position of the objective to the obliquity.

The correction means includes a tilting device for tilting during the recording and/or reading of the recording tracks at least one of the two supporting means relative to a neutral position about a pivotal axis, which axis extends at least substantially transversely of a plane which is defined by the optical axis and the axis of rotation and which at least in the second position of the objective and the turntable is situated between the axis of rotation and the optical axis, through a tilting angle which is related to the direction of the normal to the surface of the optical disk.

The electro-optical device according to the invention therefore reduces crosstalk between adjacent recording tracks either by correcting the position of the objective supporting means together with the objective relative to the surface of the optical disk or by changing the obliquity of the optical disk itself by changing the position of the turntable supporting means together with the turntable, whilst it is also possible to utilize a combination of these two possibilities.

The tilting device may be driven by an electrical drive unit, which is electronically coupled to an angular-position detector for detecting the obliquity of the disk, so that there is a direct relationship between the angles through which the objective supporting means and/or the turntable supporting means have to be tilted and the angle between the normal to the disk surface and the optical axis.

When the recording tracks of an optically readable disk are recorded and/or read the light beam which is reflected by the disk is generally disturbed. These disturbances are caused by a broad spectrum of deviations at the recording surface and the disk surface. The deviations are the result of inevitable irregularities in the recording surface and the obliquity of the disk surface. A first catergory of deviations concerns the direction of the normal to said surface at the location of the recording tracks. These deviations are also referred to as angular deviations. Second category of deviations concerns the level at which the recording tracks are situated. These deviations are also referred to as height deviations. Both categories may occur with a high frequency and with a low frequency. When electro-optical devices are utilized in non-professional disk-record players it has been found that the disturbances in the reflected light beam can be eliminated to a satisfactory extent by correcting the low-frequency angular deviations and the low-frequency high-frequency height deviations. If the electro-optical device in accordance with the invention is used, it is possible to correct at least the low-frequency angular deviations and the low-frequency height deviations by tilting at least one of the supporting means, so that the focussing actuator merely has to correct the high-frequency height deviations. The invention also relates to the possibility of at least partly correcting high-frequency deviations.

In the electro-optical device in accordance with the invention the focussing actuator can be smaller than is possible with the known device. A smaller dimension is possible at least in the axial direction because the focussing actuator should only be capable of moving the objective along the optical axis over a limited travel. A shorter and flatter focussing actuator has the direct advantage of a lower mass and, consequently, a higher efficiency. An optical disk-record player employing an electro-optical device in accordance with the invention can thus have a smaller height than a similar known disk-record player. Moreover, another favourable consequence of this limited travel of the objective is that the construction in the disk-record player comprising the electro-optical device in accordance with the invention can be dimensioned so that when the customary operating distance between the objective and the disk surface is maintained it is possible to guarantee that the objective will not touch the disk in the event of a disturbance of the electronic control system of the disk-record player.

A suitable embodiment of the invention, in which the objective supporting means is arranged on an objective frame, is characterized in that the objective frame is pivotable relative to the frame of the device and forms part of said tilting device. The combination comprising the objective frame with the objective, the objective supporting means and the focussing actuator can have a comparatively small mass, because other optical components, such as the laser, the detector, the grating, the diverting element, etc. need not be accommodated in the pivotable objective frame, so that only a limited power is required for tilting said combination.

Another suitable embodiment of the invention is characterized in that at least one of the two supporting means is arranged on a tilting element, said mechanical guide means comprise a guide which extends in a radial direction relative to the axis of rotation of the turntable, for radially moving the tilting element, which tilting element is pivotable relative to said guide means, forms part of said tilting device, and cooperates with an actuating device for tilting the tilting element. In the present embodiment the pivotal axis is situated at a fixed distance from the supporting means arranged on the tilting element. By moving the tilting element, for example by arranging the tilting element on a carriage, it is achieved that during the recording and/or reading of these recording tracks which are situated near the periphery of the optically readable disk the pivotal axis is situated between the axis of rotation and the optical axis. This enables at least a correction of the obliquity of the disk to be carried out when the objective is situated opposite that part of the disk where the obliquity of the surface is comparatively large. Said part is annular, is situated adjacent the outer circumference of the disk and roughly has a width which is substantially equal to one third of the radius of the disk. The dimensions of the tilting element can be small relative to those of the frame, so that not much power is needed both for the radial displacement and for the pivotal movement of the tilting element.

For the sake of completeness it is to be noted that an optical disk-record player is marketed which comprises an electro-optical device with a tilting element for the objective. An essential difference between this known device and the device in accordance with the invention is the location of the pivotal axis of the tilting element. In the known device the pivotal axis of the tilting element and the optical axis of the objective are situated in the same plane. By tilting the subframe it is then possible to obtain a certain correction for the obliquity of the disk, i.e. a reduction of the angle between the optical axis and the normal to the surface of the disk at the location of intersection of the optical axis with the disk surface, but an adaptation of the distance between the objective supporting means and said intersection, which distance varies as a result of the obliquity of the disk, cannot be obtained by pivoting the tilting element. As a result, this known device also has the disadvantage that the actuator should be capable of moving the objective over a substantial distance along its optical axis in order to maintain the operating distance between the objective and said surface constant. Therefore, the object of the present invention cannot be achieved by means of the known electro-optical device.

A very advantageous embodiment of the invention is characterized in that at least one of the two supporting means is arranged on a slide, said mechanical guide means comprising a parallel guide which extends in a radial direction relative to the axis of rotation of the turntable for radially moving the slide, which guide is mounted on a subframe which is pivotable relative to the frame of the device about a fixed pivotal axis and which forms part of the tilting device. In this embodiment the pivotal axis occupies a fixed position relative to the frame. This facilitates correction for the obliquity of the disk. In principle, an optimum correction can now be obtained over the entire surface area of the disk, enabling a very short focussing actuator to be used. An embodiment which may be interesting in this respect is characterized in that the subframe comprises two radially opposite end portions, the pivotal axis is situated near one of the end portions, and near the other end portion the tilting element cooperates with an actuating device for tilting the guide.

Another embodiment is characterized in that the distance from the pivotal axis to said surface of the optical disk is small relative to the distance between the axis of rotation and the optical axis, measured in the second position of the objective and the turntable. The effect of the pivotal movement of a supporting means increases as the perpendicular distance between the pivotal axis and the disk descreases, because the radial displacement of the supporting means as a result of the pivotal movement then becomes smaller. The most favourable situation is obtained when the pivotal axis is situated at said disk surface. An embodiment by means of which this situation can be obtained very simply is characterized in that the tilting device, at least one of the supporting means, and the frame together constitute a system resembling a four-bar linkage, the supporting means and the frame constituting opposite sides of the linkage and the other two sides forming part of a tilting device and making an acute angle with each other.

Calculations have shown, and experiments have confirmed, that excellent results can be obtained with an embodiment of the invention which is characterized in that the pivotal axis is spaced from the axis of rotation of the turntable at a distance which at least substantially corresponds to one third of the distance between the axis of rotation and the optical axis, measured in the second position of the objective and the turntable.

An embodiment which is particularly suitable for use in an optical disk-record player of the type having a disk-loading aperture in the front wall and comprising a loading mechanism for automatically transferring the disk to the turntable, is characterized in that the tilting device pivots at least one of the two supporting means through an additional angle when the disk is transferred to or removed from the turntable by means of the loading mechanism.

The tilting system, which is present anyway, may therefore be employed in a surprising manner for transferring the disk to or removing the disk from the turntable. This enables, for example, the loading mechanism to be simplified, because, in contradistinction to what is customary, the loading mechanism need no longer move the disk in a vertical direction when the disk is transferred to and removed from the turntable. Moreover, a small overall height of a disk-record player employing this embodiment is possible.

DETAILED DESCRIPTION OF THE PREFERRED EMBODIMENT

Figure 1:
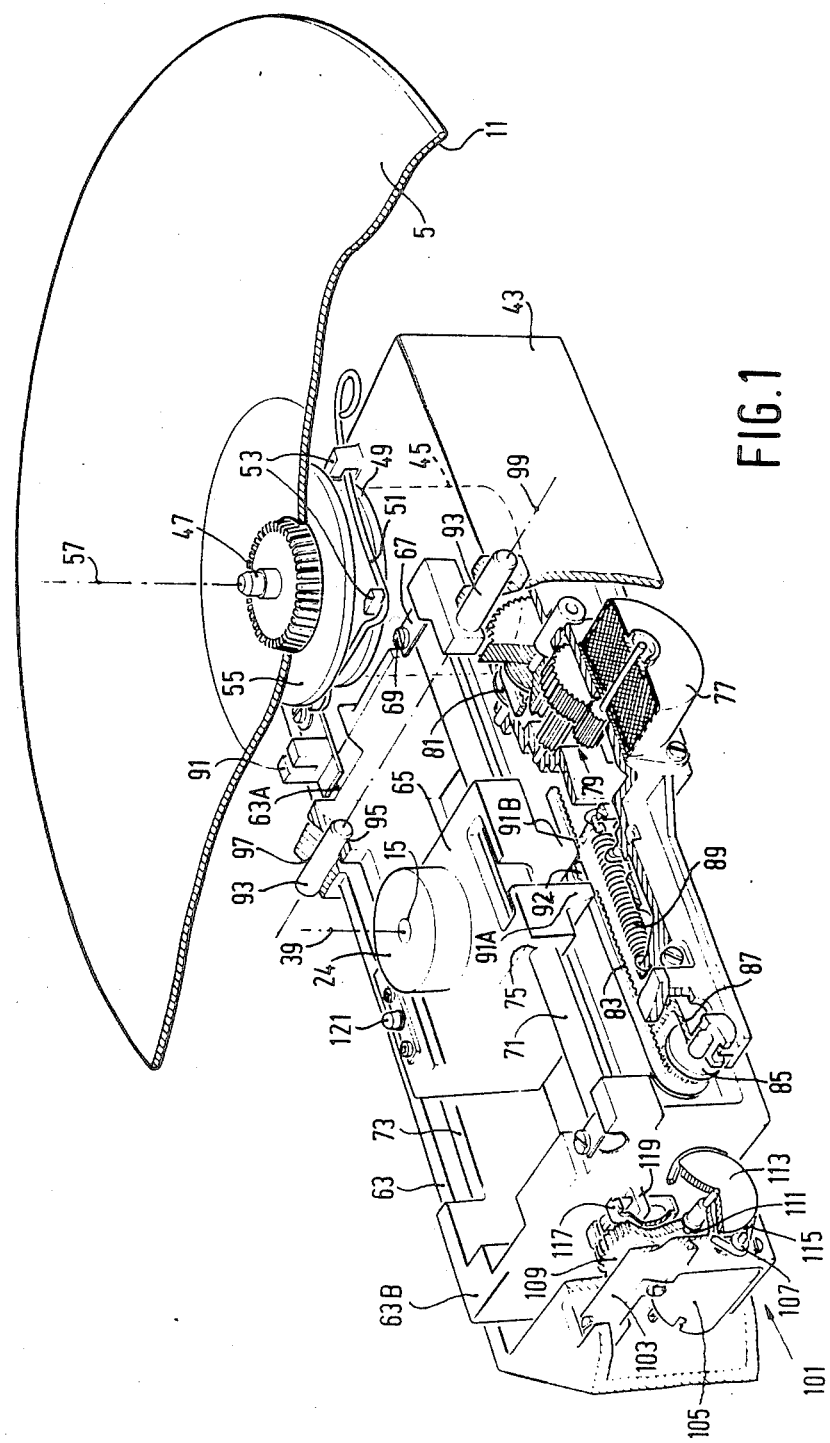
FIG. 1 is a partly cut-away perspective view showing a first embodiment.

The electro-optical device shown in FIG. 1 is capable of scanning recording tracks in a reflecting recording surface 3 of a video disk 5 by means of a radiation beam 1 (see also FIG. 2), which issues from a laser, for example a HeNe-laser or an AlGaAs-laser. For this purpose the recording surface 3 is provided with a reflecting layer 7. On the underside the recording surface 3 is covered with a transparent coating 9 having a plane surface 11. The radiation beam 1 traverses the transparent coating 9 to form a light spot 13. For this purpose, there is provided an objective system 15 which includes lenses 17A and 17B. The objective 15 concentrates the radiation beam 1 to a beam which is incident on the surface 11 of the disk, which subsequently passes through the transparent layer 9, is reflected by the recording surface 3 and then returns through the transparent layer and the objective 15 along the same path.

The objective is accommodated in a mounting sleeve 19 which in turn is mounted in a sliding bush 21. The mounting sleeve 19 and the sliding bush 21 together constitute the lens mount of the objective 15. An objective supporting means for the objective 15 includes a cylindrical bearing bush 23 and the sliding bush 21, which is an accurate axially sliding fit in the bearing bush 23. The bearing bush 23 forms part of a focussing actuator 24, which for driving the objective further includes magnetic means and a cylindrical coil 25. The magnetic means comprise an axially polarized cylindrical permanent magnet 29, a cylindrical soft-iron magnet core 31 received in the center of magnet 29 and having a flange 31A, and a flux-guiding plate 33. Between the magnet core 31 and the plate 33 an annular gap 35 is formed for the coil 25, which is secured to a flange 21A of the sliding bush 21. The sliding bush 21 itself is connected to a resilient element 37 via the flange 21A, which element 37 is secured to a base plate 27 of the actuator 24, so that upon energization of the coil 25 the sliding bush 21 is axially movable along the optical axis 39 of the objective 15 over a limited distance. A plastic ring 41 is mounted in the base plate 27 to damp the movement of the sliding bush 21.

Referring to FIG. 1, a frame 43 carries an electric motor 45 provided with a flange 49, which is urged against the frame by a U-shaped spring 41, which is hooked behind projections 53 on the frame. The motor shaft 47 carries a turntable 55 for the disk 5. The electric motor 45 serves for rotating the turntable 55 about an axis of rotation 57 and also functions as a turntable supporting means for the turntable 55.

A slide 65 which can be translated relative to subframe 63 carries the focussing actuator 24 with the objective 15. The slide 65 serves for translating the objective 15 along a radial path relative to the disk 5, which rotates about the axis of rotation 57. The slide 65 is guided by a rod 71, which is secured to the subframe 63 by means of members 67 and bolts 69, and a flat guideway 73 on a side wall of the subframe 63. The slide 65 is provided with a sleeve bearing 75 for cooperation with the rod 71 and some guide wheels, not shown, for cooperation with the guideway 73. Such a parallel guide means is known per se from European Patent Specification No. 0045537, to which U.S. Pat. No. 4,389,717 corresponds, (herewith incorporated by reference). The slide 65 is driven by an electric motor 77, which is coupled to a drive wheel 81 via a gear transmission 79, which drive wheel is journalled in the subframe 73 and cooperates with an endless timing belt 83. The belt 83 extends parallel to the rod 71 and runs over a pulley 85 which is journalled in a holder 87, which is secured to the subframe 63 so as to be movable parallel to the rod 71, in such a way that the belt 83 is tensioned under the influence of a tension spring 89 arranged between the holder 87 and the subframe 63. Two belt guides 91A and 91B and a toothed projection 92 therebetween serve to fix the belt 83 to the slide 65. The electric motor 77, which is preferably a stepping motor, can thus move the slide very accurately between a first position, in which the slide 65 is situated near a first end portion 63A of the subframe 63 near the turntable 55, and a second position, in which the slide 65 is situated near a second end portion 63B of the subframe 63, which is more remote from the turntable 55. By means of detectors such as optical detector 91, the first position and the second position of the slide 65 can be adjusted accurately. In the first position of the slide 65, the optical axis 39 of the objective 15 intersects the leading recording track of the disk 5. Similarly, the second position of the slide 65 corresponds to the trailing recording track of the disk 5.

In order to obtain a correction for an obliquity of the surface 11 of the disk 5, the subframe 63 is pivotably mounted in the frame 43. For this purpose spindles 93 are coaxially arranged on opposite sides of the subframe 63 and are supported in sleeved bearings 95 of the subframe 63 and in sleeved bearings 97 of the frame 43 to allow the subframe 63 to be tilted about a pivotal axis 99 relative to the frame 43. The pivotal axis 99 extends transversely of the plane defined by the optical axis 39 and the axis of rotation 57, the normal distance between the pivotal axis 99 and the axis of rotation 57 being about one third of the maximum distance between the axis of rotation 57 and the optical axis 39. Moreover, it has been attempted to minimize the distance from the pivotal axis 99 to the optical disk 5.

The subframe 63 is tilted about said pivotal axis 99 by means of a drive unit 101. The drive unit 101 is secured to the frame 43 via a holder 103 and comprises an electric motor 105 with a pulley 107, and a gear wheel 109 which meshes with a worm 111, which is coupled to a pulley 113, a U-belt 115 being tensioned between the pulley 107 and the pulley 113. A member 117 is eccentrically and pivotally secured to the gearwheel 109 and has an opening in which a projection 119 on the subframe 63 engages. When the electric motor 105 is energized the gear wheel 109 with the member 117 is rotated, so that as a result of the cooperation between the eccentric member 117 and the projection 119 the subframe 63 can be tilted relative to the frame 43 about the pivotal axis 99.

An angular-position detector 121 on the slide 65 can supply an error signal which depends on the angle between the optical axis 39 and the normal to the surface 11 of the optical disk 5 at the location where it is intersected by the optical axis. Control means to which the angular-position signal is applied can be used for controlling the electric motor 105. It is possible to use an angular-position detector and control means as described in Netherlands Patent Application No. 80 04 960 to which U.S. Pat. No. 4,419,545 corresponds.

Thus, by tilting the subframe 73 with the parallel guide means for the slide 65 and the focussing actuator 24 with the objective-supporting means 21, 23 on the slide 65, it can be achieved that over the entire recording area of the optical disk 5 the position of the objective 25 can be adapted to an obliquity of the disk 5 and the orientation of the objective axis 39 can be brought in conformity with the normal to the disk 5 at the location of the recording track to be written or read.

Figure 3:
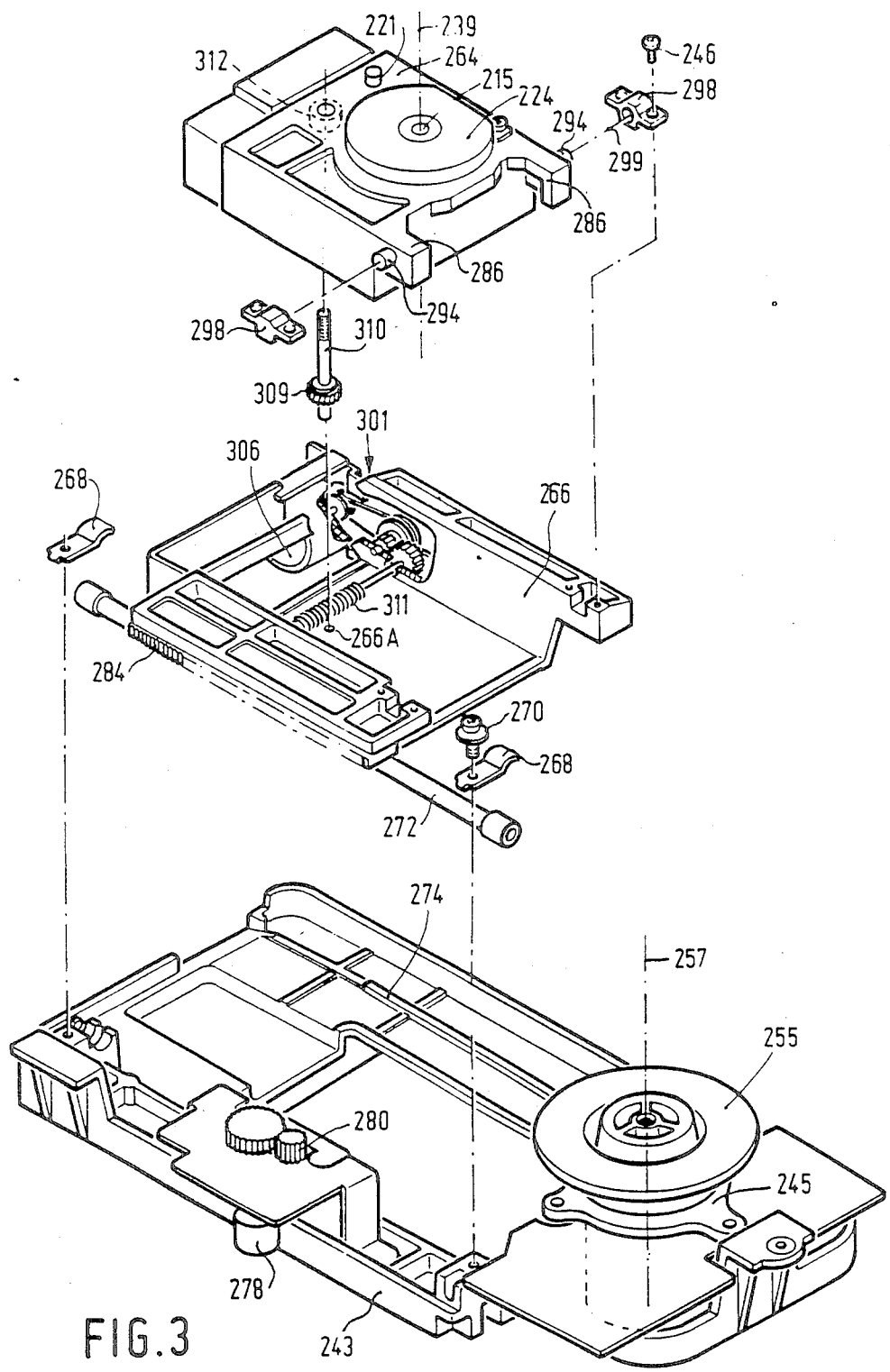
FIG. 3 is an exploded view showing a second embodiment.

FIG. 3 shows an electro-optical device in accordance with a second embodiment of the invention, by means of which an obliquity of the optical disk can be corrected by tilting the objective supporting means in the manner proposed by the present invention. This embodiment comprises a frame 243 having a turntable supporting means for a turntable 255 which is rotatable about an axis of rotation 257. The turntable 255 can be driven by means of an electric motor.

Figure 2:
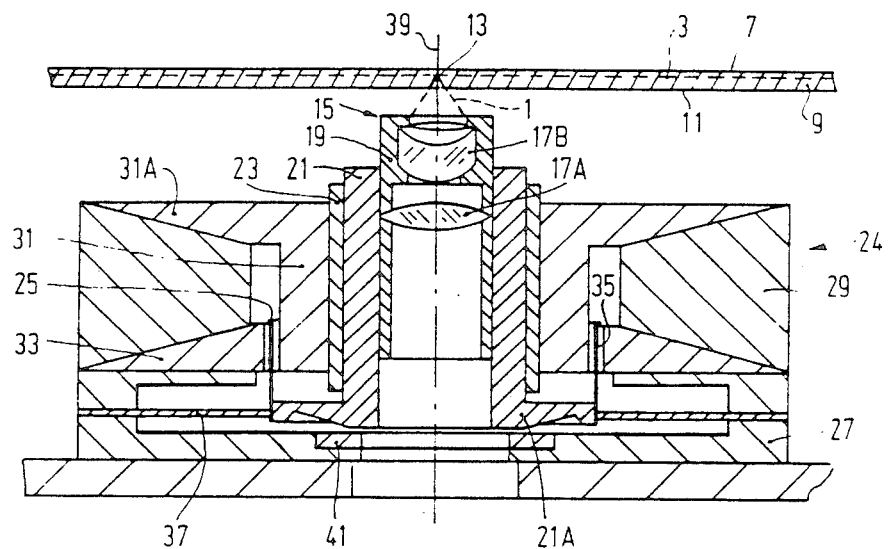
FIG. 2 is an enlarged scale sectional view showing the objective used in the first embodiment.

For recording and/or reading the optical disk the electro-optical device comprises an objective 215 with an optical axis 230, which objective is supported in and can be driven by a focussing actuator 224. This may be of a type as shown in FIG. 2. The focussing actuator 224 is secured to a tilting element 264 having a pivotal axis 299. The tilting element 264 is secured to a carriage 266, which is movable over the frame 243 in a radial direction relative to the axis of rotation 257 of the turntable 255. For this purpose, the frame 243 is provided with a guide rod 272 and a guideway 274, for the rectilinear guidance of the carriage 266. The guide rod 272 is supported in a sleeved bearings of the carriage 266 and is secured to the frame 273 by means of brackets 268 and bolts 270. For translating the carriage 266 there is provided an electric motor 278 which is mounted on the frame 243 and in which is coupled to a gear wheel 282 via a gear transmission 280, which gear wheel cooperates with a geartrack 284 adjacent the carriage 266.

The tilting element 264 comprises two axial limbs 286, which each have a laterally projecting trunnion 294. The trunnions 294 are both situated on pivotal axis 299 and are mounted in sleeve bearings 298, which are secured to the carriage 266 by means of bolts 296. This construction enables the tilting element 264 with the focussing actuator 224 and, consequently, the objective supporting means and the objective 215, to be tilted relative to the carriage 266 and the frame 243. The tilting element 264 can be tilted by means of a drive unit 301 mounted on the carriage 266. The drive unit comprises an electric motor 306, a worm 311 which is coupled to said motor via a gear transmission 315, and a gear wheel 309, which meshes with said worm. The gear wheel 309 is mounted on a partly threaded spindle 310, which is journalled in a bottom portion of the carriage 266 and which cooperates with an internally threaded nut 312 of the tilting element 264. It is to be noted that an angular-position detector 221 may be arranged on the tilting element 264.

Figure 4:
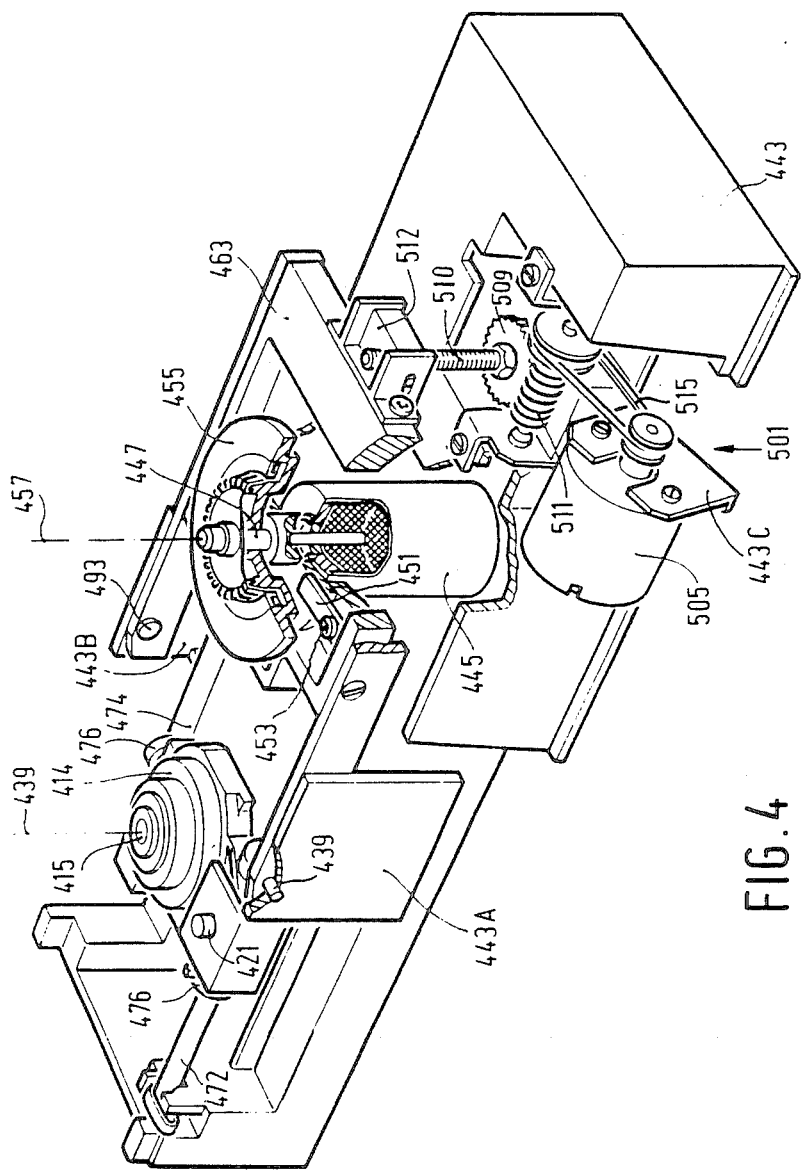
FIG. 4 is a partly cut-away perspective view showing a third embodiment.

FIG. 4 shows an electro-optical device in accordance with a third embodiment of the invention. This device comprises a turntable 455, which is fixed on a motor shaft 447 of an electric motor 445. The motor shaft 447 is rotatable about the axis of rotation 457 and may be journalled in the motor 445 in the customary manner, for example by means of sleeved bearings and a thrust bearing, the bearing arrangement for the motor shaft 447 also supporting the turntable. The device further comprises a frame 443 with mechanical guide means for radially translating, relative to the turntable 455, an objective frame 414 with an objective supporting means for an objective 415 having an optical axis 439. The mechanical guide means includes a guide rod 472 secured to the frame 443 and a guideway 474 on a sidewall of the frame 443. On one side the objective frame 414 carries a guide wheel 476 for cooperation with the guideway 474 and on the opposite side it carries a bearing 476 for the guide rod 472.

The frame 443 carries a tilting device for tilting the turntable supporting means with the turntable 455, which tilting device includes a pivotable turntable frame 463, to which the electric motor 445 with the turntable 415 mounted on the motor shaft 447 is secured by means of plates 451 and bolts 453. By means of two pivots 493 the turntable frame 463 is secured to two side plates 443A and 443B of the frame 443. The turntable frame 463 is driven by a drive unit 501, which includes an electric motor 505 secured to a mounting plate 443 C of the frame 443, and a worm 511 which is coupled to this motor by means of a belt 515. The worm 511 cooperates with a gear wheel 509, which is mounted on a lead screw 510 which extends through a projecting portion 512 of the pivotable turntable frame 463 and meshes with internal screwthread in the projecting portion. Like the preceding embodiments, the present embodiment may comprise an angular-position detector 421 for generating an angular-error signal, and control means to which the error signal may be applied to control the electric motor 505, so as to correct for the measured obliquity by tilting the turntable 455.

Figure 5:
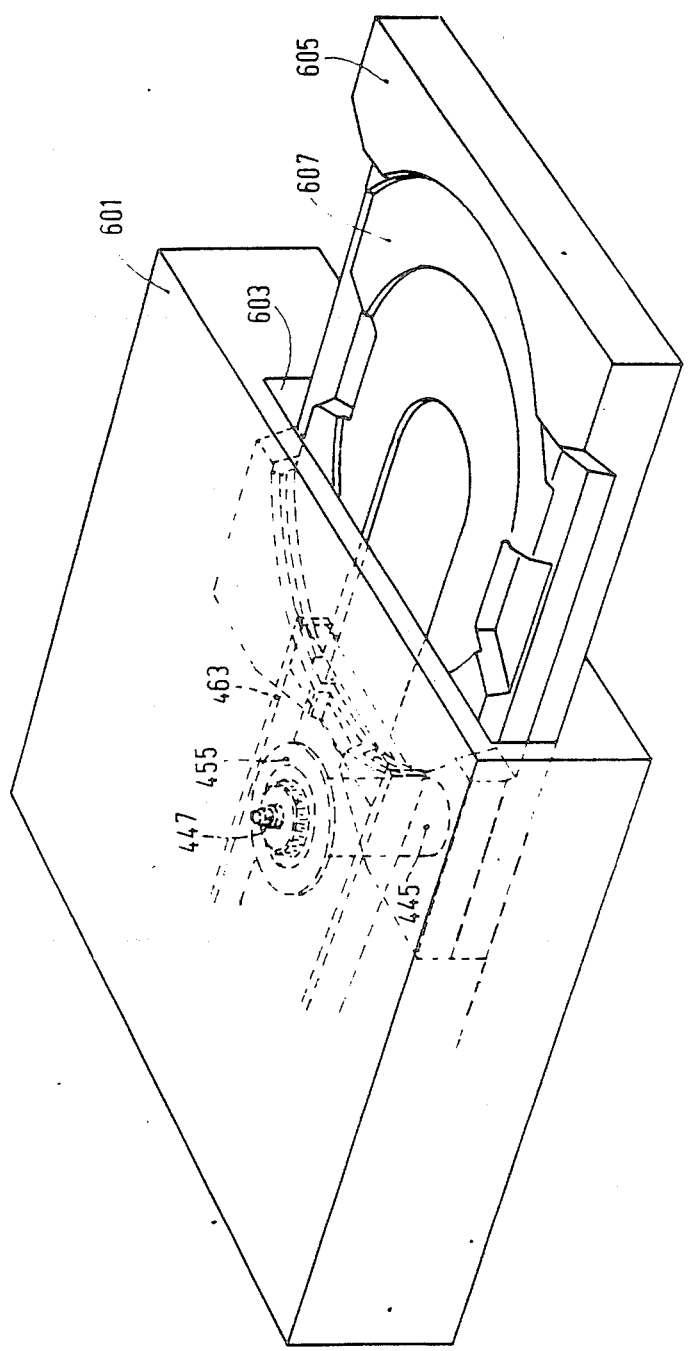
FIG. 5 is a perspective view showing an optical disk-record player.

The electro-optical device in accordance with the invention is very suitable for use in an optical disk-record player of the type as shown in FIG. 5. Such a player comprises a housing 601 with a front opening 603, through which a drawer 605 of a loading mechanism, for example as described in Netherlands Patent Application No. 8302129 to which co-pending U.S. patent application Ser. No. 617,067, filed June 4, 1984 corresponds (herewith incorporated by reference), can be translated inwards and outwards, for transferring an optical disk to and removing it from the turntable of the electro-optical device in the housing 601. The drawer 605 comprises a disc transfer means 607 which is vertically movable to enable the disk to be placed on or removed from the turntable when the drawer is in the fully retracted position.

When an embodiment as shown in FIG. 4 is employed in the player of FIG. 5, the vertical displacement of the transfer means 607 in the inward position of the drawer can be reduced substantially. It is even possible to mount the transfer means 607 immovably on the drawer 607. The tilting device 463 enables the turntable 455 to be moved so far downwards by means of the drive unit 501 when the drawer 605 is slid in or slid out, that the disk on the drawer 605 can be moved over the turntable 455 without touching it. In the inward position of the drawer 605 the turntable 455 can simply be brought in the correct position by tilting it in an upward direction, so that the disk is automatically lifted off the transfer means 607 and positioned on the turntable 455.

Embodiments other than those shown in the drawing are also possible. For example, it is not necessary that the turntable supporting means are movable about a fixed axis, as shown in FIG. 4. Tilting devices in which the pivotal axis is not stationary relative to the frame are also possible. In particular, when the turntable is to be tilted through an additional angle when the disk is transferred to and removed from the turntable by means of a loading mechanism, a construction resembling a four-bar linkage may be very suitable for this purpose. In such a construction the tilting device, at least one of the supporting means, and the frame together constitute the four-bar linkage, the supporting means and the frame constituting opposite sides of the four-bar linkage and the other two sides forming part of the tilting device and making an acute angle with each other. It is obvious that the embodiments of the invention need not necessarily be used in video-disk players. The electro-optical device in accordance with the invention is also suitable for use in audio-disk players and floppy-disk players.

What is claimed is:

1. An electro-optical device for recording and/or reading recording tracks in a recording surface of an optically readable disk by means of a radiation beam, the recording surface of the disk being provided with a transparent coating having a plane surface, which electro-optical device comprises:
    a frame;
    a turntable supporting means for a turntable which is rotatable about an axis of rotation;
    an objective supporting means for an objective having an optical axis, which objective comprises a lens system for concentrating the radiation beam to form a radiation spot,
    a focussing actuator for moving the objective along the optical axis,
    mechanical guide means for at least one of the supporting means, for moving the objective and the turntable relative to one another in a radial direction between a first position, in which the optical axis and the axis of rotation are situated nearer each other, and a second position, in which said axes are situated more remote from each other, and
    correction means for reducing the angle between the optical axis of the objective and the normal to the disk surface at the location of the intersection of the optical axis and the disk surface during the recording and/or reading the recording tracks, whereby an oblique position of said disc surface relative to said optical axis may be corrected,
characterized in that the correction means comprise a tilting device for tilting during the recording and/or reading of the recording tracks at least one of the two supporting means relative to a neutral position about a pivotal axis, which axis extends at least substantially transversely of a plane which is defined by the optical axis and the axis of rotation and which at least in the second position of the objective and the turntable is situated between the axis of rotation and the optical axis, through a tilting angle which is determined by the direction of said normal to said surface of the optical disk.

2. An electro-optical device as claimed in claim 1, in which the objective supporting means is arranged on an objective frame, characterized in that the objective frame is pivotable relative to the frame of the device and forms part of said tilting device.

3. An electro-optical device as claimed in claim 1, characterized in that at least one of the two supporting means is arranged on a tilting element, said mechanical guide means comprising a guide which extends in a radial direction relative to the axis of rotation of the turntable, for radially moving the tilting element, which tilting element is pivotable relative to the guide means and forms part of said tilting device, and the tilting element cooperates with an actuating device for tilting the tilting element.

4. An electro-optical device as claimed in claim 1, characterized in that at least one of the two supporting means is arranged on a slide, said mechanical guide means comprising a parallel guide which extends in a radial direction relative to the axis of rotation of the turntable for radially moving the slide, which guide is mounted on a subframe which is pivotable relative to the frame of the device about a fixed pivotal axis and which forms part of the tilting device.

5. An electro-optical device as claimed in claim 4, characterized in that the subframe comprises two radially opposite end portions, the pivotal axis is situated near one of the end portions, and near the other end portion the tilting element cooperates with the actuating device for tilting the guide.

6. An electro-optical device as claimed in claim 5, characterized in that the distance from the pivotal axis to said surface of the optical disk is small relative to the distance between the axis of rotation and the optical axis, measured in the second position of the objective and the turntable.

7. An electro-optical device as claimed in claim 1, characterized in that the tilting device pivots at least one of the two supporting means through an additional angle when the disk is transferred to or removed from the turntable by means of a loading mechanism.

8. An electro-optical device as claimed in claim 4, characterized in that the distance from the pivotal axis to said surface of the optical disk is small relative to the distance between the axis of rotation and the optical axis, measured in the second position of the objective and the turntable.

9. An electro-optical device as claimed in claim 3, characterized in that the distance from the pivotal axis to said surface of the optical disk is small relative to the distance between the axis of rotation and the optical axis, measured in the second position of the objective and the turntable.

10. An electro-optical device as claimed in claim 2, characterized in that the distance from the pivotal axis to said surface of the optical disk is small relative to the distance between the axis of rotation and the optical axis, measured in the second position of the objective and the turntable.

11. An electro-optical device as claimed in claim 1, characterized in that the distance from the pivotal axis to said surface of the optical disk is small relative to the distance between the axis of rotation and the optical axis, measured in the second position of the objective and the turntable.

12. An electro-optical device as claimed in claim 6, characterized in that the pivotal axis is spaced from the axis of rotation of the turntable at a distance which at least substantially corresponds to one third of the distance between the axis of rotation and the optical axis, measured in the second position of the objective and the turntable.

13. An electro-optical device as claimed in claim 5, characterized in that the pivotal axis is spaced from the axis of rotation of the turntable at a distance which at least substantially corresponds to one third of the distance between the axis of rotation and the optical axis, measured in the second position of the objective and the turntable.

14. An electro-optical device as claimed in claim 4, characterized in that the pivotal axis is spaced from the axis of rotation of the turntable at a distance which at least substantially corresponds to one third of the distance between the axis of rotation and the optical axis, measured in the second position of the objective and the turntable.

15. An electro-optical device as claimed in claim 3, characterized in that the pivotal axis is spaced from the axis of rotation of the turntable at a distance which at least substantially corresponds to one third of the distance between the axis of rotation and the optical axis, measured in the second position of the objective and the turntable.

16. An electro-optical device as claimed in claim 2, characterized in that the pivotal axis is spaced from the axis of rotation of the turntable at a distance which at least substantially corresponds to one third of the distance between the axis of rotation and the optical axis, measured in the second position of the objective and the turntable.

17. In electro-optical device as claimed in claim 1, characterized in that the pivotal axis is spaced from the axis of rotation of the turntable at a distance which at least substantially corresponds to one third of the distance between the axis of rotation and the optical axis, measured in the second position of the objective and the turntable.

* * * * *